3,660,451
REACTION PRODUCTS OF SILICON MONOXIDE AND ORGANIC HALIDES AND METHODS OF MAKING THE SAME
Erich T. Schaschel, Toledo, Ohio, assignor to Owens-Illinois, Inc.
No Drawing. Filed Aug. 24, 1970, Ser. No. 66,577
Int. Cl. C07b 7/08, 7/12
U.S. Cl. 260—448.2 R    21 Claims

ABSTRACT OF THE DISCLOSURE

Organo silicon polymers are prepared by the reaction of silicon monoxide and an organic monohalide such as 1-chloro-butane to provide a polymer that is useful as a lubricant, stop-cock grease and as a filler for ceramic and plastic compositions.

THE INVENTION

The present invention relates to the reaction products of silicon monoxide and an organic monohalide such as 1-bromobutane and to methods for preparing said reaction products.

In the past, reaction products of silicon monoxide and halogenated organic compounds such as carbon tetrachloride have been prepared by heating solid silicon monoxide to about 1200 to 1300° C. in a chamber under a vacuum generally between $1\times10^{-6}$ to $1\times10^{-2}$ torr, to form gaseous silicon monoxide, mixing the gaseous silicon monoxide with an organic halide such as carbon tetrachloride or other completely halogenated organic compounds and condensing the mixture on the cooled surface of a rotatable cylinder within the chamber to provide a reaction product. Upon warming from a temperature such as $-196°$ C. to room temperature, the resultant products exploded. Hence, in the past, reaction products of gaseous silicon monoxide with halogenated compounds such as carbon tetrachloride, tetrachloroethylene and hexafluoro-benzene have not been useful and the methods of making such products have not been commercially feasible.

It is an object of the present invention to provide a new reaction product by reacting gaseous silicon monoxide in a vacuum with an organic monohalide to provide a reaction product that is an organo silicon polymer containing Si—O—Si bonds, as well as sometimes Si—Si bonds.

It is an object of the present invention to provide a reaction product of silicon monoxide and an organic monohalide such as 1-chloro-butane and methods for preparing the same.

It is an object of the present invention to provide a reaction product of silicon monoxide and an organic monohalide such as 1-chloro-butane or 1-bromo-butane that does not explode upon warming to room temperature.

These and other objects will be apparent from the specification that follows and the appended claims.

The present invention provides a reaction product of silicon monoxide and an organic monohalide such as 1-chloro-butane, 1-bromo-butane, chloro-benzene and bromo-benzene.

The present invention also provides methods of preparing organo silicon polymers by mixing gaseous silicon monoxide provided by heating solid silicon monoxide to about 1200° to 1300° C. in a chamber under a vacuum generally between $1\times10^{-6}$ to $1\times10^{-2}$ torr and preferably between 1 to $5\times10^{-5}$ torr with an organic monohalide such as chloro-benzene and depositing the mixture, for instance, on the cooled surface of a rotatable cylinder within the chamber to provide a useful product that does not exploded when the condensate is warmed to room temperature or heated beyond room temperature.

Generally the molar ratio of organic monohalide compound to silicon monoxide is in the range of about 1.5:1 to 120:1 and preferably about 6:1 to 60:1. The reaction of silicon monoxide with organic monohalides apparently takes place on the cooled surface at a temperature generally of about $-196°$ to $+30°$ C. and preferably about $-196°$ to $-70°$ C. A large excess molar amount of organic monohalide compound promotes the insertion reaction rather than the polymerization of SiO itself.

In general, the polymeric condensate is a solid, infusible material that is either insoluble in organic solvents or soluble in solvents such as acetone, dioxane, dimethyl formamide, etc. The polymer is one that has a high surface area and is hygroscopic. The polymer has good high temperature resistant properties. Thus, in general, the products are solid and infusible (they decompose very slowly and gradually at higher temperatures such as those above 400–450° C.).

In accordance with the present vention, the molecular formula for the reaction product is approximately as follows:

SiO+1-chloro-butane: $C_4H_9Cl(SiO)_6$
SiO+1-bromo-butane: $C_4H_9Br(SiO)_4$
SiO+chloro-benzene: $C_6H_5Cl(SiO)_6$
SiO+bromo-benzene: $C_6H_5Br(SiO)_5$ Infrared spectroscopy and hydrolytic decomposition data show that the primary reaction to take place is the insertion reaction of SiO into the carbon-halogen bond of the organic halide:

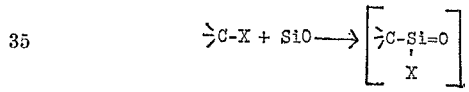

where X is a halogen such as fluorine, bromine and iodine and preferably chlorine.

The insertion reaction is in competition with the polymerization of SiO itself but the insertion reaction can be promoted by a large molar excess of organic halide compound to SiO, although the polymerization of SiO itself apparently cannot be excluded completely.

The above-described insertion reaction intermediate is unstable and generally polymerizes further—the final reaction product being a polysiloxane containing in a complex form dimers, trimers and polymers of SiO. These SiO units apparently are responsible for the high degree of cross-linking in the product.

Silicon monoxide can be obtained commercially (as, for instance, from Union Carbide Corp.) and can be prepared by reducing $SiO_2$ with Si, SiC, C, $H_2$, etc. at generally a high temperature. The reduction of $SiO_2$ with Si provides maximum yield and this process is generally preferred for preparing the silicon monoxide, this process being characterized by its high reaction velocity and absence of secondary reactions that might possibly contaminate the final product. A detailed discussion of the nature and thermodynamic properties of solid silicon monoxide can be found in a monograph by N. A. Toropov, V. P. Barzakowskii, High Temp. Chemistry of Silicates and Other Oxide Systems, Izd. AN SSSR, Moscow, 1963. The disclosure of this publication is hereby incorporated by reference. The preparation of silicon monoxide is also disclosed in U.S. Pats. Nos. 2,882,177 and 2,823,979 which are also incorporated by reference.

Preferred organic monohalide compounds are monochloro compounds such as chloro-methane, chloro-ethane, 1-chloro-propane, 1-chloro-butane, 1-chloro-pentane, 1-chloro-hexane, chloro-benzene and chloro-toluene and monobromo compounds such as 1-bromo-butane, 1-bromo-pentane, 1-bromo-hexane, bromo-benzene and bromo-toluene. Other suitable organic monohalides are those having the formula R—X where X is a halogen atom and R is an organic monovalent radical that is an alkyl group having 1 to 12 carbon atoms such as methyl, ethyl, propyl, butyl, hexyl, octyl and decyl, or an aromatic group such as phenyl and naphthyl, the aromatic group preferably having 6 to 12 carbon atoms. Other suitable specific examples of the R group are nonyl, duodecyl, benzyl, tolyl and diphenyl. Suitable specific organic monohalides are monofluoro compounds such as 1-fluorobutane, 1-fluorohexane and fluorobenzene and monoiodo compounds such as 1-iodo-butane and iodo-benzene.

The following examples are intended to illustrate the present invention and are not intended to limit the same in any way.

EXAMPLE 1

1-chloro-butane was reacted with silicon monoxide using a rotatable cylinder within a chamber with a high vacuum. The rotatable cylinder was cooled with liquid nitrogen to serve as a quenching trap. The silicon monoxide was prepared by heating commercial SiO to about 1200° to 1300° C. at a pressure of about 1 to $5 \times 10^{-5}$ torr and the gaseous silicon monoxide resulting therefrom was quenched onto the cooled surface with a large excess of organic monohalide reactant (the molar ratio of silicon monoxide:1-chloro-butane being 1:20). On warming to room temperature, no explosion occurred as in the case of carbon tetrachloride and the excess of unreacted 1-chloro-butane was pumped off and the reaction product, a white involatile solid, was left on the surface and had to be scratched off preferably in a dry nitrogen atmosphere. The product was hygroscopic, infusible and insoluble in inert solvents. The yield based on silicon monoxide condensed onto the cold trap was 100% and the solid material had a molecular formula of approximately $C_4H_9Cl(SiO)_6$.

The resultant product was useful as a stop-cock grease and as a filler in ceramic and organopolysiloxane compositions. It was used as a filler in an organopolysiloxane molding composition using 5 parts by weight thereof as a filler per 100 parts by weight of the organopolysiloxane.

EXAMPLE 2

1-bromo-butane was reacted with silicon monoxide according to the procedure described in Example 1.

A white solid with a molecular formula of approximately $C_4H_9Br(SiO)_4$ was recovered from the quenching trap. It was infusible, insoluble in inert solvents and sensitive to moist air. The yield based on the silicon monoxide condensed on the cold trap was 100%.

In the above examples, other organo monohalides such as chloro-benzene and bromo-benzene can be substituted in whole or part for the 1-chloro-butane and 1-bromo-butane used to provide substantially equivalent results.

What is claimed is:

1. A reaction product of one mole of silicon monoxide and about 1.5 to 120 moles of an aliphatic hydrocarbon monohalide compound.

2. An organosilicon polymer having a molecular chain with (—Si—O—Si—) units prepared by the reaction of one mole of silicon monoxide and about 1.5 to 120 moles of an aliphatic hydrocarbon monohalide, the silicon monoxide and monohalide being mixed at a pressure of about $1 \times 10^{-6}$ to $1 \times 10^{-2}$ torr to form a mixture that is condensed at about —196° to 100° C. to provide the polymer.

3. A method of preparing an organo silicon polymer comprising reacting one mole of silicon monoxide with about 1.5 to 120 moles of an aliphatic hydrocarbon monohalide compound, the silicon monoxide and monohalide compound being mixed at a pressure of about $1 \times 10^{-6}$ to $1 \times 10^{-2}$ torr to form a mixture that is condensed at about —196° to 100° C. to provide the polymer.

4. A method of preparing an organo silicon polymer comprising the steps of mixing one mole of gaseous silicon monoxide and about 1.5 to 120 moles of an aliphatic hydrocarbon monohalide in a vacuum at a pressure of about $1 \times 10^{-5}$ to $5 \times 10^{-5}$ torr to form a mixture, and condensing the mixture at about —196° to —70° C. to provide an organo silicon polymer that is a reaction product of silicon monoxide and the monohalide.

5. A reaction product as defined in claim 1 in which the organic halide compound is 1-chloro-butane.

6. A polymer as described in claim 2 in which the organic monohalide is 1-bromo-butane.

7. A polymer as defined in claim 2 in which the organic monohalide is chloro-methane.

8. A method as defined in claim 4 in which the organic monohalide is chloro-ethane.

9. A method as defined in claim 4 in which the organic monohalide is 1-chloro-butane.

10. A method for preparing an organo silicon polymer comprising the steps of mixing one mole of gaseous silicon monoxide at a pressure of about $1 \times 10^{-6}$ to $1 \times 10^{-2}$ torr with about 1.5 to 120 moles of a gaseous aliphatic hydrocarbon monohalide to form a mixture, and condensing the mixture at a temperature of about —196° to 100° C. to provide the organo silicon polymer.

11. A method as defined in claim 10 in which the molar ratio of organic monohalide to silicon monoxide is about 1.5:1 to about 120:1.

12. A method as defined in claim 10 in which the molar ratio of organic monohalide to silicon monoxide is about 6:1 to 60:1.

13. A method as defined in claim 10 in which the organic monohalide is 1-chloro-butane and the molar ratio of 1-chloro-butane to silicon moonxide is about 20:1.

14. A method as defined in claim 10 in which the pressure is about $1 \times 10^{-5}$ to $5 \times 10^{-5}$ torr.

15. A method as defined in claim 14 in which the condensing of the mixture is at a temperature of about —196° to —70° C.

16. A method of preparing an organo silicon polymer comprising the steps of heating solid silicon monoxide to about 1200° to 1300° C. in a high vacuum to form gaseous silicon monoxide, and about 1.5 to 120 moles of a gaseous aliphatic hydrocarbon monohalide in a vacuum having a pressure of about $1 \times 10^{-6}$ to $1 \times 10^{-2}$ torr to form a mixture, and condensing the mixture at about —196° to 100° C. to obtain the organo silicon polymer having a molecular chain containing units.

17. A method as defined in claim 16 in which the organic monohalide is 1-chloro-butane.

18. A method as defined in claim 16 in which the organic monohalide is 1-bromo-butane.

19. A reaction product of silicon monoxide and 1-chloro-butane.

20. A reaction product of silicon monoxide and 1-bromo-butane.

21. A reaction product of silicon monoxide and chloro-hexane.

References Cited

Chemical Abstracts, 50, p. 15206e.

TOBIAS E. LEVOW, Primary Examiner

P. F. SHAVER, Assistant Examiner

U.S. Cl. X.R.

117—134 F, 147; 252—49.6; 260—46.5 R, 375 B, 448.2 E